Patented Apr. 6, 1948

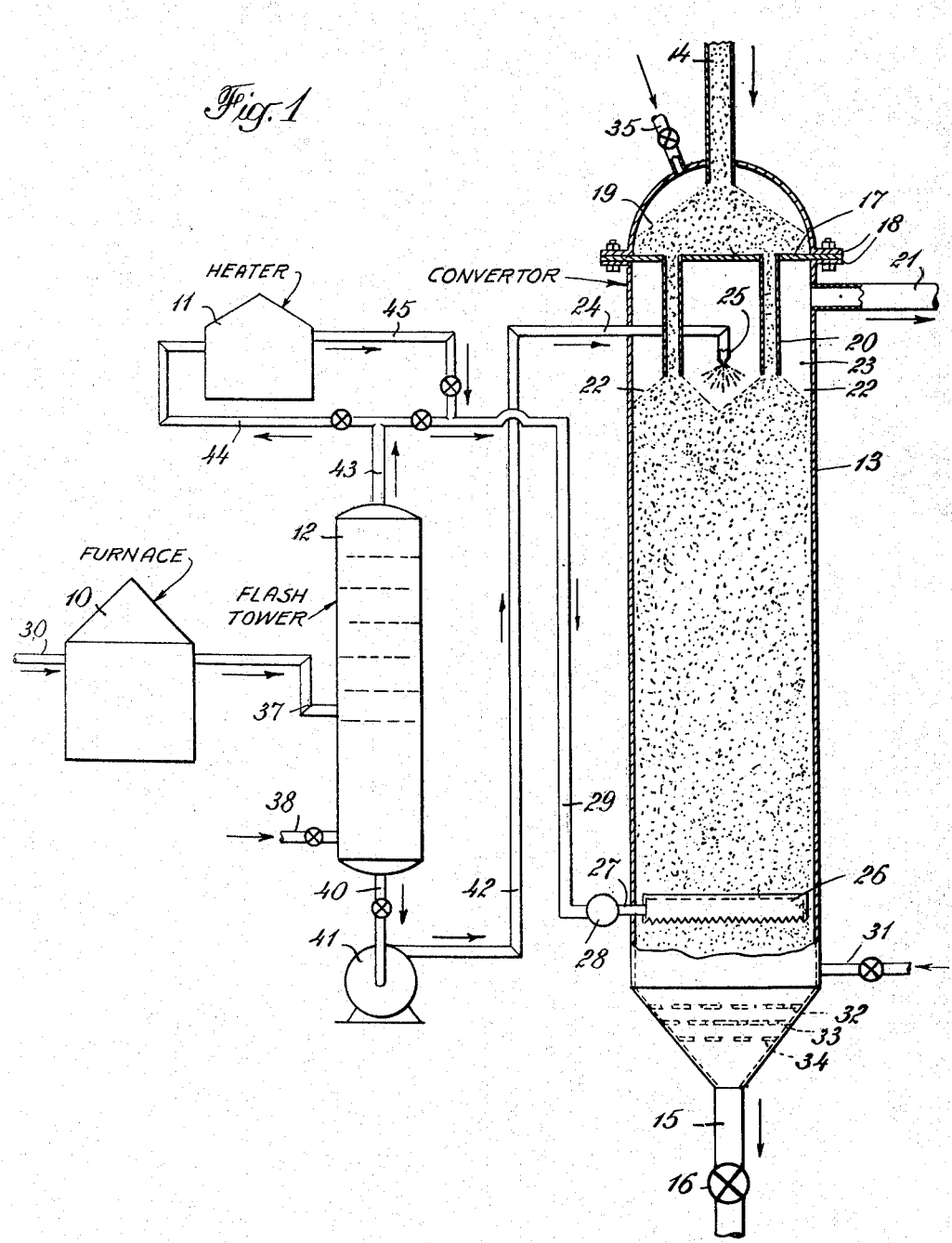

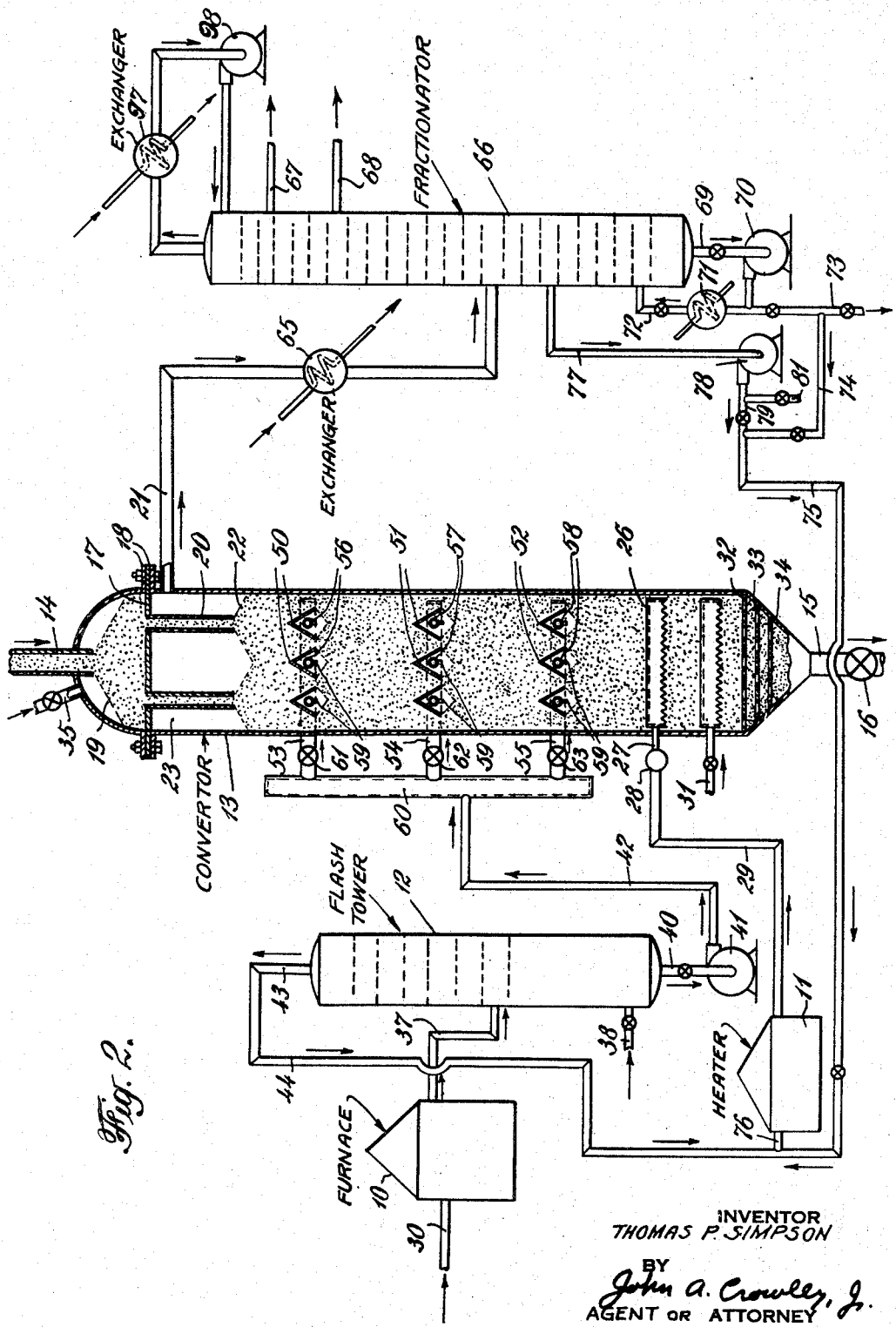

2,439,372

UNITED STATES PATENT OFFICE 2,439,372

METHOD FOR HYDROCARBON CONVERSION

Thomas P. Simpson, Woodbury, N. J., assignor to Socony-Vacuum Oil Company, Incorporated, a corporation of New York Application June 12, 1946, Serial No. 676,222

14 Claims. (Cl. 196—52)

This invention has to do with a method for conversion of hydrocarbons to lower boiling hydrocarbons boiling preferably in the gasoline boiling range and lower. The invention is specifically directed to a method for the conversion of high boiling hydrocarbons in the presence of a moving column of particle form contact material.

The method is applicable to processes wherein the contact material is catalytic in nature or to processes wherein the contact material is substantially inert, for example, a refractory. The term "contact material" as used herein in describing and in claiming this invention unless further qualified is employed in a broad sense as covering both catalytic and inert, solid materials. When the contact material involved is catalytic in nature it may take the form of natural or treated clays, bauxites, activated alumina, and certain synthetic associations of silica, alumina or silica and alumina to which may be added small percentages of other materials such as metallic oxides. In processes wherein the contact material is inert it may take the form of particles or balls of metal, pebbles, particles of coke, carborundum, firebrick, fused alumina, mullite, zirkite, etc. Since this invention is one involving the contact of reactants with a substantially compact column of contact material particles, the size of the contact material particles should, in the case of cracking catalysts, fall broadly within the range about 2 to 100 mesh and preferably within the range 3 to 10 mesh by Tyler standard screen analysis. On the other hand, for other operations involving an inert contact material, for example thermal coking of heavy petroleum stocks, the preferable size of the particles may be somewhat greater, for example, particles of order of ¼ inch to ¾ inch average diameter.

It is well known that when petroleum hydrocarbons boiling within the range about 450-750° F. are contacted in the gaseous phase at temperatures usually above 800° F. and at usually superatmospheric pressure with a particle form catalytic material they may be converted into lower boiling gasoline containing products. A certain amount of contaminant coke is deposited upon the catalyst during the hydrocarbon conversion and must be removed in order to maintain the catalyst activity. An important commercially developed form of the process is one wherein the catalyst is passed as a substantially compact column of particles cyclically through a conversion zone wherein it contacts gaseous hydrocarbons to effect the conversion thereof and through a regeneration zone wherein it contacts a combustion supporting gas such as air acting to burn off the carbonaceous contaminant deposit.

While heretofore such continuous catalytic cracking processes have been chiefly limited to the conversion of hydrocarbon fractions capable of being vaporized at the desired catalytic conversion temperature, a major object of this invention is the provision of an improved process wherein a high boiling liquid hydrocarbon charge may be converted to lower boiling gaseous hydrocarbon products in the presence of a substantially compact column of moving catalyst.

Another object of this invention is the provision of an improved process for the simultaneous conversion of gaseous hydrocarbons and high boiling liquid hydrocarbon charge to lower boiling gaseous, gasoline containing hydrocarbon products in the presence of the same moving column of particle form contact material.

Another object of this invention is the provision in a process for the conversion of a high boiling liquid hydrocarbon charge to lower boiling hydrocarbons in the presence of a vertical moving column of particle form contact material of a method of operation permitting accurate control of the contact material temperature in the lower section of the column and efficient purging of entrained hydrocarbons from the contact material passing from the lower end of the conversion zone.

These and other objects of the invention will become apparent from the following discussion of the invention. Before proceeding with this discussion, certain terms used in describing and claiming the invention will be defined. The term "gaseous" is employed in the broad sense as covering material in the gaseous phase under the particular operating conditions of temperature and pressure at which said material is present regardless of the normal phase of said material under ordinary atmospheric conditions. The term "high boiling liquid hydrocarbon charge" is intended to cover a liquid hydrocarbon charge which boils mostly above the average temperature at which it is to be converted.

In a broad form the method of this invention is one wherein a particle form contact material at a suitable temperature for supporting the hydrocarbon conversion is passed downwardly through a confined conversion zone as a substantially compact column. A high boiling liquid hydrocarbon charge is distributed onto the contact material at at least one level in said column spaced substantially above its lower end to effect the conversion of said liquid hydrocarbon charge to lower boiling gaseous hydrocarbons. A gaseous hydrocarbon charge is introduced into the lower section of said column below the level of liquid introduction and passed upwardly through the contact material column to effect conversion of said gaseous hydrocarbon charge to lower boiling gaseous hydrocarbon products. The mixed gaseous hydrocarbon product is withdrawn from the upper section of the column.

The invention may be more readily understood by reference to the attached drawings wherein Figure 1 is an elevational view, partially in section, showing one form of the invention and Figure 2 is an elevational view, partially in section, showing a preferred arrangement according to this invention. Both drawings are highly diagrammatic in form.

Turning now to Figure 1, we find heating furnaces 10 and 11 which may be of conventional construction adapted for heating petroleum fractions; a flash separation tower 12 and a vertical conversion vessel 13. The conversion vessel is provided with a solids inlet conduit 14 at its upper end and a solids outlet conduit 15 bearing flow control valve 16 at its lower end. A partition 17 is supported between flanges 18 across the upper section of the vessel 13 so as to define a seal chamber 19 in its upper end. Conduits 20 depend from the partition 17 for flow of contact material from the chamber 19 onto the surface of a column of contact material 22 maintained in the vessel 13 therebelow and to define a gas solid disengaging space 23. A gas outlet conduit 21 is connected to the vessel shell below the partition 17 and above the lower ends of conduits 20. An inlet conduit 24 for liquid hydrocarbon introduction extends into the gas space 23, and a suitable liquid spray nozzle 25 is provided on the end of said conduit. Within the lower section of vessel 13 is provided a row of spaced apart horizontally extending gaseous hydrocarbon distributing troughs of which one, 26, may be seen. Each distributing trough is supplied by means of an inlet pipe 27 connecting into a manifold 28 which in turn is supplied through an inlet conduit 29. Below the row of troughs 26 is provided a similar row of troughs (not shown) and inlet pipe 31 for purge gas introduction. The distributing troughs may take any of a number of forms suitable for gas distribution into a column of solid particles. A series of orifice containing partitions 32–34, inclusive, adapted to control the contact material flow uniform across the vessel thereabove are provided in the lower section of the vessel 13. An inlet 35 for introduction of seal gas into seal chamber 19 is provided at the upper end of the vessel 13.

As an example of the operation according to the method of this invention the catalytic conversion of a petroleum fraction boiling over the range 400° F. to about 1100° F. may be considered. The petroleum fraction is introduced through pipe 30 into the furnace 10 wherein it passes through suitable coils so as to become heated to a temperature sufficiently high to permit partial vaporization thereof but insufficient to cause substantial thermal cracking thereof. For example, the heated petroleum fraction may be withdrawn from the furnace 10 at a temperature of the order of 700° F. to 850° F. and passed through conduit 37 into the flash tower 12. A gas such as steam may be introduced through conduit 38 to aid in the vaporization of the hydrocarbons. A non-vaporized fraction is withdrawn from the bottom of tower 12 through conduit 40 and pumped by pump 41 through conduit 42 into the liquid inlet 24 from which the high boiling liquid hydrocarbon charge is sprayed onto the surface 22 of the contact material in vessel 13. The liquid hydrocarbon charge passes downwardly through the vessel 13 on the contact material until it is substantially converted to lower boiling gaseous hydrocarbon products. The liquid fraction introduced into the vessel 13 should preferably for the most part boil above the average conversion temperature in the vessel 13. For example, where the desired average conversion temperature is 850° F., the fraction introduced through nozzle 25 should be made up for the most part of constituents boiling above 850° F. The vaporized fraction from tower 12 is withdrawn therefrom through conduit 43 and passes through conduit 29, manifold 28 and pipes 27 under the distributing troughs 26 in the lower section of the conversion vessel. Usually it is desirable to further heat the fraction withdrawn from the top of tower 12 before introduction into the conversion vessel. In this case, the vapors pass through conduits 43 and 44 into and through heater 11 and then via conduits 45 and 29 to the conversion vessel. It is generally desirable to supply part of the conversion heat requirements by preheating the vaporized hydrocarbon charge in heater 11 to a level above the desired conversion temperature but below the level at which thermal cracking thereof occurs. The temperature of gaseous hydrocarbon preheat will vary broadly within the approximate range about 800° F. to 950° F. depending upon the constituents of the particular gaseous fraction being preheated and depending upon the desired conversion temperature within vessel 13. The gaseous hydrocarbon charge passes upwardly through the contact material column while undergoing conversion and the mixed gaseous hydrocarbon conversion products are withdrawn from the upper section of vessel 13 through outlet 21. Freshly regenerated catalyst from a suitable regeneration vessel (not shown) enters the seal chamber 19 through conduit 14 and then passes through conduits 20 into the conversion zone. The inlet catalyst temperature should be such as will support the desired hydrocarbon conversion and for gasoline products may fall broadly within the range 850–1150° F. depending upon the particular operation involved. Spent catalyst bearing a carbonaceous contaminant deposited during the hydrocarbon conversion is withdrawn from the bottom of vessel 13 through conduit 15 at a rate so controlled by valve 16 as to maintain the conversion zone filled with a substantially compact column of catalyst particles. The outflowing catalyst is purged with an inert gas such as steam or flue gas introduced at 31 to remove vaporizable hydrocarbons from the catalyst. An inert gas is introduced through conduit 35 into seal section 19 at a sufficient rate to maintain a seal gas pressure in chamber 19 slightly higher than the reactant pressure in gas space 23.

It has been found that the above described method of operation offers certain important operational advantages not provided by other methods of operation. It has been often found advisable to conduct catalytic conversion of gaseous hydrocarbons by a countercurrent catalyst hydrocarbon flow process. It has been found, however, that if an attempt be made to catalytically convert a high boiling liquid hydrocarbon charge by a countercurrent flow process— i. e., by introduction of the liquid charge near the lower end of the convertor, for example at the level of trough 26 of Figure 1. A substantial amount of liquid charge is carried from the convertor on the outflowing spent catalyst regardless of steam purging at a point below the liquid inlet. In an attempt to avoid this difficulty, a concurrent catalyst oil flow process may be adapted—i. e., liquid oil is introduced to the upper end of the convertor and gaseous products are withdrawn near the lower end, for example through trough 26 of Figure 1. It has been found that in this type of concurrent flow operation, the catalyst temperature is apt to be at its lowest level at the point of hydrocarbon product outlet. As a result, in some operations it is very difficult even with a substantial amount of steam stripping to distill the heavier non-converted or polymerized liquid hydrocarbons from the outflowing spent catalyst. A substantial loss of liquid hydrocarbons and a substantially higher burning load on the catalyst regenerator results. By the operation of this invention, the liquid hydrocarbons introduced into the upper section of the convertor pass downwardly with the catalyst until converted to lower boiling gaseous products. These gaseous products then pass upwardly through as much as the catalyst column as exists thereabove at the point of their formation. By introduction of a gaseous hydrocarbon charge, existing at or about the desired average conversion temperature into the lower section of the convertor, the catalyst column at this level is maintained at a temperature substantially above what it would be in a strictly concurrent liquid hydrocarbon conversion method. As a result, the heavier liquid hydrocarbons remaining on the catalyst at the level of the purge zone may be easily removed from the catalyst by steam or flue gas purging. Moreover, the gaseous hydrocarbons introduced to the lower section of the conversion zone serve as a highly efficient stripping medium to reduce the liquid hydrocarbon deposit in the catalyst to a minimum before the catalyst reaches the steam purging zone. The gaseous hydrocarbon charge passes upwardly through that section of the catalyst column in which the liquid charge is converted and promotes more uniform liquid catalyst contacting in this section as well as more uniform ultimate contaminant deposits on all of the catalyst.

The invention is not limited to the spraying of the liquid hydrocarbon charge onto the surface of the contact material column in the conversion zone. In many operations, in order to insure adequate contacting and conversion of the products from the liquid charge, it is desirable to introduce the liquid charge to one or more points below the contact material column surface but substantially above its lower end and above the level of gaseous hydrocarbon introduction. Such a preferred modification is shown in Figure 2 wherein many of the apparatus elements are similar to those shown in Figure 1 and are indicated by like numerals. Within the convertor 10 there are provided three vertically spaced rows of horizontally extending, spaced, inverted angle shaped troughs 50, 51 and 52. These troughs extend horizontally substantially across the vessel and serve to provide a solid free gas space thereunder. Liquid hydrocarbon charge is supplied from manifolds 53, 54 and 55 into pipes 56, 57, 58, which extend horizontally the length of the troughs 50, 51 and 52, respectively. Spray nozzles or orifices 59 are provided at intervals along the length of each of the pipes 56, 57 and 58. The liquid charge may be pumped from flash tower 12 by means of pump 41 into a common vertical feeder manifold 60 which supplies each of the horizontal manifolds 53, 54 and 55. Valves 61, 62 and 63 on manifolds 53, 54, and 55, respectively, permit introduction of liquid hydrocarbons independently to any one of three levels in the convertor or to any two or three of said levels simultaneously. Thus, for example, liquid hydrocarbons may be introduced only at the level of troughs 50 or, if desired, at the levels of all three rows of troughs 50, 51 and 52, while gaseous hydrocarbons are supplied from tower 12 and heater 11 through conduit 29, manifold 28, pipes 27 and trough 26 to the lower section of the vessel 13. It has been found preferable in the cracking conversion of high boiling liquid hydrocarbons to space the uppermost liquid inlet a sufficient distance below the surface of the contact material column to avoid vapor channeling and to permit the rising vapors to pass through a substantial layer of fresh incoming catalyst before leaving the reaction zone. A distance of about 3 feet below the surface of the contact material column is satisfactory in many operations; other settings may be most desirable in other specific applications. The mixed gaseous product may be withdrawn from the upper section of vessel 13 through conduit 21 and then passed through heat exchanger 65 into the fractionator 66. Light vapors withdrawn from the top of fractionator 66 pass through condenser 97 and are pumped by pump 98 back into the fractionator as reflux. Gasoline and lighter products may be withdrawn from the other section of fractionator 66 through conduit 67 and products of the kerosene and light gas oil boiling range may be withdrawn through conduit 68. A heavy bottoms cut passes from the bottom of fractionator 66 through conduit 69 into pump 70. Part of the bottoms cut may be circulated through exchanger 71 and back into the fractionator through conduit 72 and part of the bottoms cut may be withdrawn as product through conduit 73 or employed as a gaseous recycle by passage through conduits 74 and 75 to the inlet 76 of heater 11. A lighter cycle cut may be withdrawn from the fractionator through conduit 77 through which it passes to pump 78 and thence through conduits 79 and 75 into the inlet 76 of furnace 11 wherein it is joined by the gaseous fraction withdrawn from flash tower 12. A light cycle stock product may be withdrawn from the system through conduit 81.

By employing the recycling technique described hereinabove, a gaseous charge for introduction under members 26 may be provided even when the total original charging stock does not contain a vaporizable fraction. In such an operation, an outside gas oil fraction is used as the gaseous charge to members 26 only long enough to get the system operating, then the entire vaporizable charge may consist of a recycle cut obtained as a product from the cracking of the original liquid charge. This cycle stock is passed via conduit 75 to heater 11 and then through conduit 29 to the lower section of vessel 13.

It will be understood that the drawings are highly diagrammatic in form and the invention is not intended to be limited to the particular details of apparatus construction shown. Modified constructions which will be readily apparent to those skilled in the art may be substituted for the catalyst and liquid and gaseous hydrocarbon introducing means shown in the drawings.

The proper length of the vessel 13 will vary from one application of the invention depending upon such factors as contact material rate of flow, the nature of the reactants and the desired space velocity thereof. In general, the length of the conversion zone for commercial cracking conversion of hydrocrabons may be between about 3 to 30 feet, the contact material flow rate between about 0.5 to 10 feet per minute and the weight ratio of contact material to high boiling liquid hydrocarbons charged may fall between about 1 to 10 parts of contact material to one part of liquid hydrocarbon charged.

In general, the rate of contact material flow and the inlet temperature thereof should be such as will support the desired hydrocarbon conversion to gaseous products without permitting the contact material temperature to fall below the predetermined suitable range of conversion temperature. For the catalytic cracking conversion of hydrocarbons it has been found that the inlet contact material temperature should lie within the range 800–1150° F.

It should be understood that it is not intended that this invention be limited to the specific examples of operation conditions, applications and apparatus construction set forth hereinabove or that the invention be otherwise limited except as set forth in the following claims.

I claim:

1. A method for conversion of gaseous and high boiling liquid hydrocarbon charges in the presence of a moving contact material which comprises: passing a particle form solid contact material at a suitable conversion supporting temperature through a confined conversion zone as a substantially compact, vertical column of downwardly moving particles, introducing a gaseous hydrocarbon charge into said column in the lower section of said conversion zone and passing said gaseous hydrocarbon charge upwardly through said column to effect its conversion to a gaseous product containing lower boiling hydrocarbons, distributing a high boiling liquid hydrocarbon charge onto the contact material in said column in said conversion zone at at least one level substantially above the level of gaseous hydrocarbon introduction to effect conversion of said liquid hydrocarbons to a lower boiling gaseous hydrocarbon product and withdrawing the mixed gaseous products from the upper section of said conversion zone above the level of liquid and gaseous hydrocarbon introduction.

2. A method for conversion of gaseous hydrocarbons and a high boiling liquid hydrocarbon charge to gaseous gasoline containing products which comprises: passing a particle form catalytic contact material at an elevated temperature suitable for the hydrocarbon conversion through an elongated vertical conversion zone as a substantially compact column of downwardly moving particles, spraying a heated high boiling liquid hydrocarbon charge boiling substantially all above the average conversion temperature onto the contact material in said conversion zone at at least one level spaced substantially above its lower end, introducing a heated gaseous hydrocarbon charge boiling above the gasoline boiling range into the lower section of said column within said conversion zone below the level of liquid hydrocarbon introduction, and withdrawing gaseous gasoline containing conversion products from the upper section of said conversion zone and withdrawing contact material from said zone below the level of gaseous hydrocarbon introduction substantially free of hydrocarbons except for a contaminant deposit.

3. A method for conversion of a petroleum fraction boiling above the boiling range of motor gasoline and containing high boiling liquid constituents which comprises: passing a particle form solid contact material at a suitable elevated hydrocarbon conversion temperature downwardly through a confined conversion zone as a substantially compact column of downwardly moving solid particles, heating a stream of said petroleum fraction to accomplish partial vaporization thereof, separating vaporized and non-vaporized fractions, introducing the non-vaporized liquid fraction into said conversion zone at at least one level substantially above its lower end to effect its substantial conversion to lower boiling gaseous hydrocarbons, introducing said vaporized fraction into the lower section of said column below the level of said liquid introduction and passing it upwardly through said column so that it passes through the level of liquid introduction, withdrawing mixed gaseous products from the upper section of said conversion zone and separately withdrawing used contact material from the lower section of said column.

4. The method for catalytic conversion of petroleum hydrocarbons boiling above motor gasoline to lower boiling gasoline containing products which method comprises: maintaining a substantially compact confined, vertical column of particle form catalyst, within an elongated confined zone, replenishing said column at the upper end of said zone with regenerated catalyst existing at a suitable temperature above the desired average hydrocarbon conversion temperature, withdrawing spent catalyst from the lower end of said zone at a controlled rate, heating a stream of petroleum hydrocarbons boiling above motor gasoline to a temperature suitable for the vaporization of most constituents boiling below the desired catalytic conversion temperature, passing said heated hydrocarbons into a flash zone to effect the separation of vaporized and non-vaporized constituents, spraying said non-vaporized liquid fraction onto said contact material in said column substantially above its lower end, introducing said vaporized hydrocarbons into said column below the level of liquid introduction, withdrawing mixed gaseous gasoline containing hydrocarbons from the upper section of said column, maintaining a blanket of a substantially inert gas adjacent the upper end of said elongated zone to prevent the escape of hydrocarbons from its upper end and passing an inert purge gas upwardly through the lower section of said column to purge hydrocarbons from the catalyst before its withdrawal.

5. A method for conversion of a petroleum fraction boiling above the boiling range of motor gasoline and containing high boiling liquid constituents which comprises: passing a particle form solid catalyst at a suitable elevated hydrocarbon conversion temperature downwardly through a confined conversion zone as a substantially compact column of downwardly moving solid particles, heating a stream of said petroleum fraction to accomplish partial vaporization thereof, separating vaporized and non-vaporized fractions, introducing the non-vaporized liquid fraction into said conversion zone at at least one level substantially above its lower end to effect its substantial conversion to lower boiling gaseous hydrocarbons, further heating said vaporized fraction to a temperature above the suitable catalytic conversion temperature but below a level at which substantial thermal cracking of the vaporized hydrocarbons occurs, introducing the heated vaporized fraction into the lower section of said column below the level of said liquid introduction and passing it upwardly through said column so that it passes through the level of liquid introduction and withdrawing mixed gaseous products from the upper section of said conversion zone.

6. The method for catalytic conversion of petroleum hydrocarbons boiling above motor gasoline to lower boiling gasoline containing products which method comprises: maintaining a substantially compact confined, vertical column of particle form catalyst, replenishing said column at its upper end with regenerated catalyst existing at a suitable temperature for the conversion of said hydrocarbons, withdrawing spent catalyst, substantially free of hydrocarbons except for a contaminant deposit, from the lower end of said zone at a controlled rate, heating a stream of said petroleum hydrocarbons boiling above motor gasoline to a temperature suitable for the vaporization of most constituents boiling below the desired catalytic conversion temperature, passing said heated hydrocarbons into a flash zone to effect the separation of vaporized and non-vaporized constituents, spraying said non-vaporized liquid fraction onto the surface of said column so that it passes downwardly with the catalyst particles until converted into gaseous products, introducing the vaporized fraction from said flash zone into the lower section of said column and passing it upwardly therethrough to effect its conversion, and withdrawing the mixed gaseous conversion products from the upper end of said column.

7. A method for conversion of gaseous and high boiling liquid hydrocarbon charges in the presence of a moving contact material which comprises: passing a particle form solid contact material at a suitable conversion supporting temperature through a confined conversion zone as a substantially compact, vertical column of downwardly moving particles, introducing a gaseous hydrocarbon charge into said column in the lower section of said conversion zone and passing said gaseous hydrocarbon charge upwardly through said column to effect the conversion to a gaseous product containing lower boiling hydrocarbons, introducing a heated high boiling liquid hydrocarbon charge into the upper section of said column a spaced vertical distance below its upper end to effect the conversion of said liquid hydrocarbons to lower boiling gaseous hydrocarbons and withdrawing the mixed gaseous hydrocarbon products from the upper section of said column above the level of said liquid hydrocarbon introduction.

8. The method for catalytic conversion of petroleum hydrocarbons boiling above motor gasoline to lower boiling gasoline containing products which method comprises: maintaining a substantially compact confined vertical column of particle form catalyst, replenishing said column at its upper end with regenerated catalyst, independently withdrawing spent catalyst from the lower end of said zone at a controlled rate, heating a stream of said petroleum hydrocarbons boiling above motor gasoline to a temperature suitable for the vaporization of most constituents boiling below the desired catalytic conversion temperature, passing said heated hydrocarbons into a flash zone to effect the separation of vaporized and non-vaporized constituents, spraying said non-vaporized liquid fraction into the upper section of said column a spaced distance below the upper end so that it passes downwardly with the catalyst until it is converted into gaseous hydrocarbon products, introducing the vaporized fraction from said flash zone into the lower section of said column and passing it upwardly therethrough to effect its conversion and withdrawing mixed gaseous hydrocarbon conversion products from the top of said column.

9. A method for conversion of gaseous and high boiling liquid hydrocarbon charges in the presence of a moving contact material which comprises: passing a particle form solid contact material at a suitable conversion supporting temperature through a confined conversion zone as a substantially compact, vertical column of downwardly moving particles, introducing a gaseous hydrocarbon charge into said column in the lower section of said conversion zone and passing said gaseous hydrocarbon charge upwardly through said column to effect its conversion to a gaseous product containing lower boiling hydrocarbons, introducing a heated high boiling liquid hydrocarbon charge into said column at a plurality of vertically spaced levels along its length, all of said levels being substantially above the lower end of said zone, and withdrawing the mixed gaseous hydrocarbon products from the upper section of said column above the level of said liquid hydrocarbon introduction.

10. A method for conversion of a petroleum fraction boiling above the boiling range of motor gasoline and containing high boiling liquid constituents which comprises: passing a particle form catalyst at a suitable catalytic hydrocarbon conversion temperature downwardly through a confined conversion zone as a substantially compact column of downwardly moving solid particles, heating a stream of said petroleum fraction to accomplish partial vaporization thereof, separating vaporized and non-vaporized fractions, introducing the non-vaporized liquid fraction into said conversion zone at a plurality of vertically spaced levels along its length and above its lower end to effect conversion of said liquid hydrocarbons to lower boiling gaseous hydrocarbons, introducing said vaporized fraction into the lower section of said zone below the levels of liquid hydrocarbon introduction and passing it upwardly through said column in said zone so that it passes through said levels of liquid introduction and withdrawing mixed gaseous products from the upper section of said conversion zone.

11. A method for conversion of a high boiling liquid hydrocarbon charge in the presence of a moving particle-form contact material which comprises: passing a particle-form solid contact material at a suitable conversion supporting temperature through a confined conversion zone as a substantially compact column of downwardly moving particles, distributing a high boiling liquid hydrocarbon charge onto the contact material in said column in said conversion zone at at least one level spaced substantially above its lower end to effect the conversion of said liquid hydrocarbons to lower boiling gaseous products, withdrawing gaseous products from the upper section of said conversion zone above the level of liquid charge introduction, fractionating from said gaseous products a suitable recycle fraction, vaporizing said recycle fraction and introducing the vapors into the lower section of said column within said conversion zone below the level of liquid hydrocarbon introduction to effect its conversion and withdrawing the gaseous products from the conversion of said vaporous recycle fraction from the upper section of said vessel as a portion of the gaseous product withdrawn therefrom as aforesaid.

12. A method for conversion of a high boiling liquid hydrocarbon charge in the presence of a moving particle-form contact material which comprises: passing a particle-form solid contact material at a suitable conversion supporting temperature through a confined conversion zone as a substantially compact column of downwardly moving particles, introducing a heated high boiling liquid hydrocarbon charge into the upper section of said column a spaced vertical distance below its upper end to effect the conversion of said liquid hydrocarbons to lower boiling gaseous hydrocarbon products withdrawing gaseous hydrocarbon products from the upper section of said conversion zone above the level of said liquid charge introduction, fractionating gasoline, and lighter constituents from said gaseous products and introducing at least a portion of the gaseous products boiling above the gasoline boiling range in a heated and gaseous condition into said column within said conversion zone at a level below that of said liquid charge introduction to effect conversion thereof to lower boiling gaseous products and withdrawing said last named gaseous products along with the gaseous products from said liquid charge from the upper section of said conversion zone.

13. A method for conversion of a petroleum fraction boiling above the boiling range of motor gasoline and containing high boiling liquid constituents which comprises: passing a particle form solid contact material at a suitable elevated hydrocarbon conversion temperature downwardly through a confined conversion zone as a substantially compact column of downwardly moving solid particles, heating a stream of said petroleum fraction to accomplish partial vaporization thereof, separating vaporized and non-vaporized fractions, introducing the non-vaporized liquid fraction into said conversion zone at at least one level substantially above its lower end to effect its substantial conversion to lower boiling gaseous hydrocarbons, introducing said vaporized fraction into the lower section of said column below the level of said liquid introduction and passing it upwardly through said column so that it passes through the level of liquid introduction, withdrawing mixed gaseous products from the upper section of said conversion zone, fractionating from said gaseous products a suitable cycle fraction, heating said cycle fraction to vaporize it and introducing said cycle fraction into the lower section of said column to effect its conversion to lower boiling gaseous hydrocarbons.

14. The method for catalytic conversion of petroleum hydrocarbons boiling above motor gasoline to lower boiling gasoline containing products which method comprises: maintaining a substantially compact confined vertical column of particle form catalyst, replenishing said column at its upper end with regenerated catalyst existing at a suitable temperature to support the conversion of said hydrocarbons, withdrawing spent catalyst substantially separately of fluid hydrocarbons from the lower end of said zone at a controlled rate, heating a stream of said petroleum hydrocarbons boiling above motor gasoline to a temperature suitable for the vaporization of most constituents boiling below the desired catalytic conversion temperature, passing said heated hydrocarbons into a flash zone to effect the separation of vaporized and non-vaporized constituents, spraying said non-vaporized liquid fraction into the upper section of said column a spaced distance below the upper end so that it passes downwardly with the catalyst until it is converted into gaseous hydrocarbon products, introducing the vaporized fraction from said flash zone into the lower section of said column and passing it upwardly therethrough to effect its conversion, withdrawing mixed gaseous hydrocarbon conversion products from the top of said column, fractionating said products to provide a suitable cycle cut boiling above the gasoline boiling range, heating said cycle cut to vaporize the same and introducing said vaporized cycle cut into said column along with said vaporized fraction from said flash zone.

THOMAS P. SIMPSON.

REFERENCES CITED

The following references are of record in the file of this patent:

UNITED STATES PATENTS

| Number | Name | Date |
|---|---|---|
| 2,239,801 | Voorhees | Apr. 29, 1941 |
| 2,362,621 | Fahnestock | Nov. 14, 1944 |
| 2,372,018 | Ruthruff | Mar. 20, 1945 |
| 2,398,280 | Barron | Apr. 9, 1946 |